(12) United States Patent
Yun et al.

(10) Patent No.: US 6,486,934 B2
(45) Date of Patent: Nov. 26, 2002

(54) METHOD FOR MANUFACTURING FRINGE FIELD SWITCHING MODE LIQUID CRYSTAL DISPLAY DEVICE

(75) Inventors: Suk Shin Yun, Seoul (KR); Seong Yik Park, Seoul (KR); Young Tae Kwon, Kyoungki-do (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 48 days.

This patent is subject to a terminal disclaimer.

(21) Appl. No.: 09/738,157

(22) Filed: Dec. 15, 2000

(65) Prior Publication Data

US 2001/0005238 A1 Jun. 28, 2001

(30) Foreign Application Priority Data

Dec. 24, 1999 (KR) .............................. 99-61704

(51) Int. Cl.[7] ............................ G02F 1/1343
(52) U.S. Cl. .......................... 349/141; 349/147; 349/43
(58) Field of Search ................................. 349/139, 141, 349/187

(56) References Cited

U.S. PATENT DOCUMENTS 6,172,728 B1 * 1/2001 Hiraishi ..................... 349/139
6,335,770 B1 * 1/2002 Komatsu .................... 349/38
6,362,858 B1 * 3/2002 Jeon et al. ................... 349/43

* cited by examiner

*Primary Examiner*—Toan Ton
*Assistant Examiner*—Timothy L Rude
(74) *Attorney, Agent, or Firm*—Ladas & Parry

(57) ABSTRACT

The present invention discloses a method for manufacturing a fringe field switching mode liquid crystal display device. Here, a gate bus line has a double layer structure of an ITO layer and an opaque metal layer, and thus the gate bus line and a counter electrode region where a counter electrode is formed are formed at the same time. In addition, a data bus line has a double layer structure of the ITO layer and the opaque metal layer, and thus the data bus line and a pixel electrode region where a pixel electrode is formed are formed at the same time. A polyimide layer is employed as an electrode insulating layer formed between the pixel electrode and the counter electrode.

8 Claims, 7 Drawing Sheets

METHOD FOR MANUFACTURING FRINGE FIELD SWITCHING MODE LIQUID CRYSTAL DISPLAY DEVICE

BACKGROUND OF THE INVENTION

1. Field of the Invention

The present invention relates to a liquid crystal display device, and in particular to a fringe field switching mode liquid crystal display device including a pixel electrode and a counter electrode of a transparent material which generate a fringe field having homogeneous elements in parallel to a surface of a rear substrate in a liquid crystal cell.

2. Description of the Background Art

A homogeneous alignment mode liquid crystal display device developed by Hitachi company in Japan is an in-plane switching mode liquid crystal display device, and has a better field angle property than a twisted nematic mode liquid crystal display device. However, the homogeneous alignment mode liquid crystal display device has a poor opening ratio and transmissibility. In order to overcome such a disadvantage, there has been suggested a fringe field switching mode liquid crystal display device.

In the fringe field switching mode liquid crystal display device, a counter electrode and a pixel electrode consist of a transparent conductive material on a rear substrate. An interval between the counter electrode and the pixel electrode is larger than an interval between a front substrate and the rear substrate. Accordingly, when a picture voltage is applied between the counter electrode and the pixel electrode, a fringe field is generated in a liquid crystal cell, thereby re-aligning liquid crystal molecules.

A method for manufacturing the fringe field switching mode liquid crystal display device will now be described with reference to FIG. 1.

An indium tin oxide(ITO) layer is formed at the upper portion of the rear substrate 1 according to a sputtering method, by using Ar gas, $O_2$ gas and ITO target. The ITO layer is patterned according to a first mask process, thereby forming a counter electrode 2 in a comb or plate shape.

Thereafter, an opaque metal layer for a gate bus line is formed according to the sputtering method at the upper portion of the rear substrate 1 where the counter electrode 2 has been formed. The opaque metal layer for the gate bus line is patterned according to a second mask process, thereby forming a gate bus line 3, a gate pad and a common electrode line(not shown).

A gate insulating layer 4, an amorphous silicon layer 5 and a doped amorphous silicon layer 6 are sequentially stacked at the upper portion of the rear substrate 1 where the gate bus line 3, common electrode line and gate pad have been formed. The amorphous silicon layer 5 and the doped amorphous silicon layer 6 are patterned according to a third mask process, thereby forming a channel and an ohmic contact portion of a thin film transistor.

An ITO layer is formed according to the sputtering method at-the upper portion of the rear substrate 1 where the channel and ohmic contact portion of the thin film transistor have been formed. The ITO layer is patterned according to a fourth mask process, thereby forming a comb-shaped pixel electrode 7.

Thereafter, the gate insulating layer 4 is removed according to a fifth mask process, thereby opening the gate pad.

An opaque metal layer for a data bus line is formed according to the sputtering method at the upper portion of the rear substrate where the pixel electrode 7 has been formed and the gate pad has been opened. The opaque metal layer for the data bus line is patterned according to a sixth mask process, thereby forming a source electrode 8a, a drain electrode 8b and a data bus line(not shown). Here, a contact portion of the gate pad is formed at the same time.

At last, a protective layer(not shown) is deposited at the upper portion of the rear substrate 1 where the source and drain electrodes 8a, 8b and the data bus line have been formed. The protective layer is patterned according to a seventh mask process, thereby opening the pixel electrode 7 and the contact portion of the gate pad.

However, the conventional method for manufacturing the fringe field switching mode liquid crystal display device has a disadvantage in that a manufacturing time and cost are increased and a yield is reduced due to many mask processes.

SUMMARY OF THE INVENTION

Accordingly, an object of the present invention is to provide a method for manufacturing a fringe field switching mode liquid crystal display device which can decrease a number of mask processes.

In order to achieve the above-described object of the present invention, a method for manufacturing a fringe field switching mode liquid crystal display device is applied to a fringe field switching mode liquid crystal display device including a pixel electrode and a counter electrode formed on a rear substrate to generate a fringe field in a liquid crystal cell; a thin film transistor consisting of a gate electrode, a source electrode, a drain electrode and a channel, and applying a picture signal between the pixel electrode and the counter electrode; and a gate pad formed at the edge of the rear substrate. Firstly, a transparent conductive layer for a counter electrode and an opaque metal layer for a gate bus line are sequentially stacked on the surface of the rear substrate. The transparent conductive layer for the counter electrode and the opaque metal layer for the gate bus line are patterned in an identical shape, thereby forming a gate bus line connected to the gate electrode, a counter electrode region for forming the counter electrode, and a gate pad region for forming the gate pad. Thereafter, a gate insulating layer, an amorphous silicon layer and a doped amorphous silicon layer are sequentially stacked on the rear substrate where the gate bus line and the counter electrode region have been formed. The gate insulating layer, the amorphous silicon layer and the doped amorphous silicon layer are patterned in an identical shape, thereby forming an active region overlapped with the whole region of the gate bus line. The opaque metal layer for the gate bus line in the counter electrode region and gate pad region is removed, thereby forming the counter electrode and the gate pad. An electrode insulating layer is deposited on the rear substrate where the active region, counter electrode and gate pad have been formed. The electrode insulating layer is patterned, thereby opening a part of the active region and the gate pad. A transparent conductive layer for a pixel electrode and an opaque metal layer for a data bus line are deposited on the rear substrate where the active region and gate pad region have been opened. The transparent conductive layer for the pixel electrode and the opaque metal layer for the data bus line are patterned in an identical shape, thereby forming a data bus line crossing the gate bus line, a source electrode and a drain electrode respectively electrically connected to the active region, the channel of the thin film transistor being positioned therebetween, a pixel electrode region for forming the pixel electrode to be overlapped with the counter electrode, and a contact portion of the gate pad. Thereafter, a protective layer is deposited on the rear substrate where the data bus line, source electrode, drain electrode, pixel electrode region and gate pad have been formed. The deposited protective film is patterned, thereby opening the pixel electrode region and the contact portion of the gate pad. Thereafter, the opaque metal layer for the data bus line in the opened pixel electrode region is removed, thereby forming the pixel electrode.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A method for manufacturing a fringe field switching mode liquid crystal display device in accordance with a preferred embodiment of the present invention will now be described with reference to the accompanying drawings.

FIGS. 2A through 2E are plan views respectively illustrating sequential steps of the method for manufacturing the fringe field switching mode liquid crystal display device, and FIGS. 3A through 3E are cross-sectional views respectively illustrating the sequential steps of the method for manufacturing the fringe field switching mode liquid crystal display device.

Figure 1:
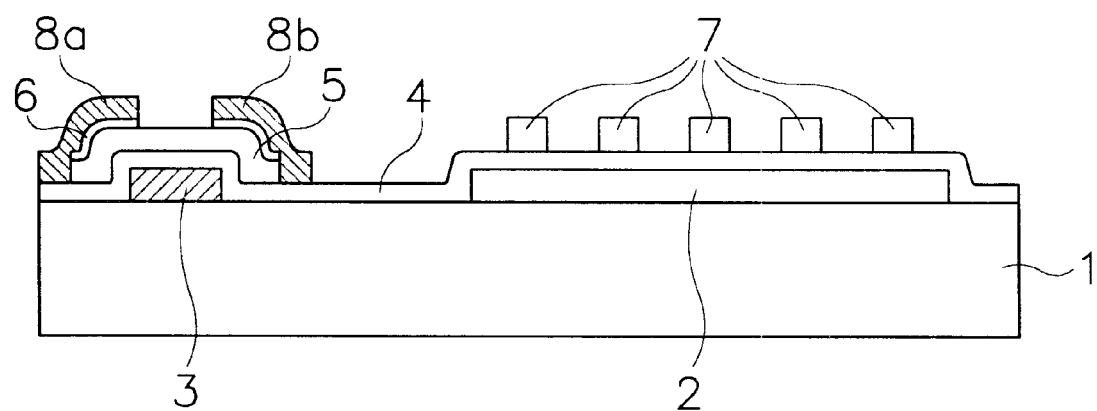
FIG. 1 is a cross-sectional view illustrating a major portion of a conventional fringe field switching mode liqu id crystal display device.
Figure 2A:
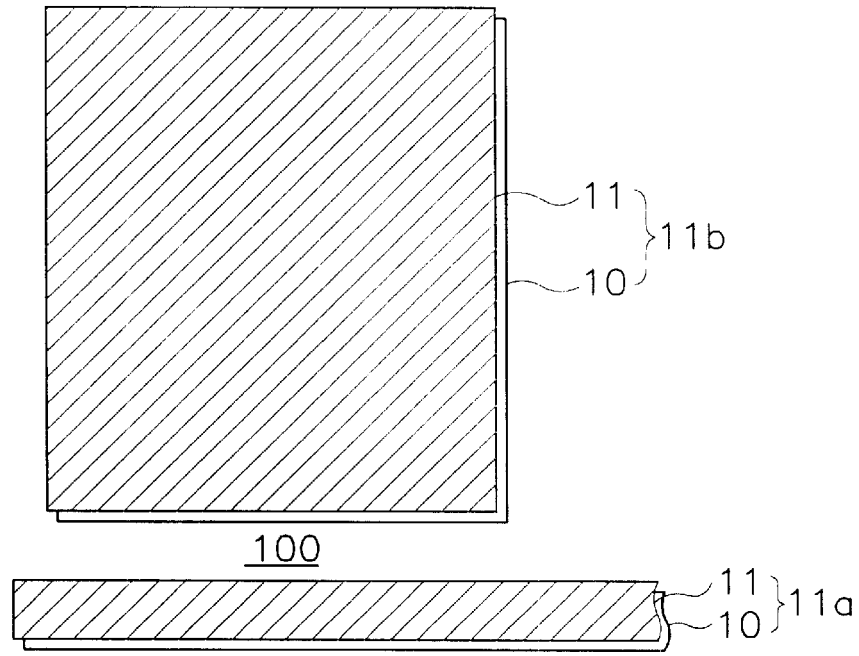
FIGS. 2A through 2E are plan views illustrating sequential steps of a method for manufacturing a fringe field switching mode liquid crystal display device in accordance with a preferred embodiment of the present invention.
Figure 3A:
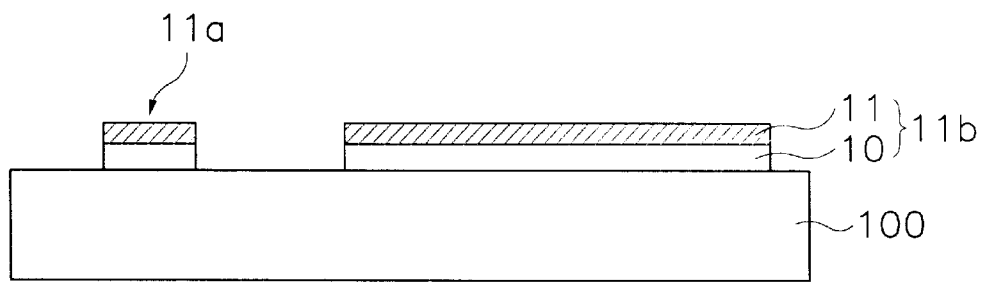
FIGS. 3A through 3E are cross-sectional views illustrating the sequential steps of the method for manufacturing the fringe field switching mode liquid crystal display device in accordance with the preferred embodiment of the present invention.

Referring to FIGS. 2A and 3A, an indium tin oxide (ITO) layer 10 which is a transparent conductive layer and an opaque metal layer 11 for a gate bus line such as Mo, Cr, Al and MoW are sequentially stacked on a rear substrate 100. The opaque metal layer 11 for the gate bus line and the ITO layer 10 are patterned according to a first mask process, thereby forming a gate bus line 11a and a counter electrode region 11b for forming a counter electrode. The gate bus line 11a has a double layer structure of the ITO layer 10 and the opaque metal layer 11 for the gate bus line. Here, the counter electrode region 11b is formed in a plate shape, but may be formed in a comb shape.

On the other hand, in the first mask process, a gate pad region(not shown) for forming a gate pad is formed at the edge of the rear substrate 100.

Figure 2B:
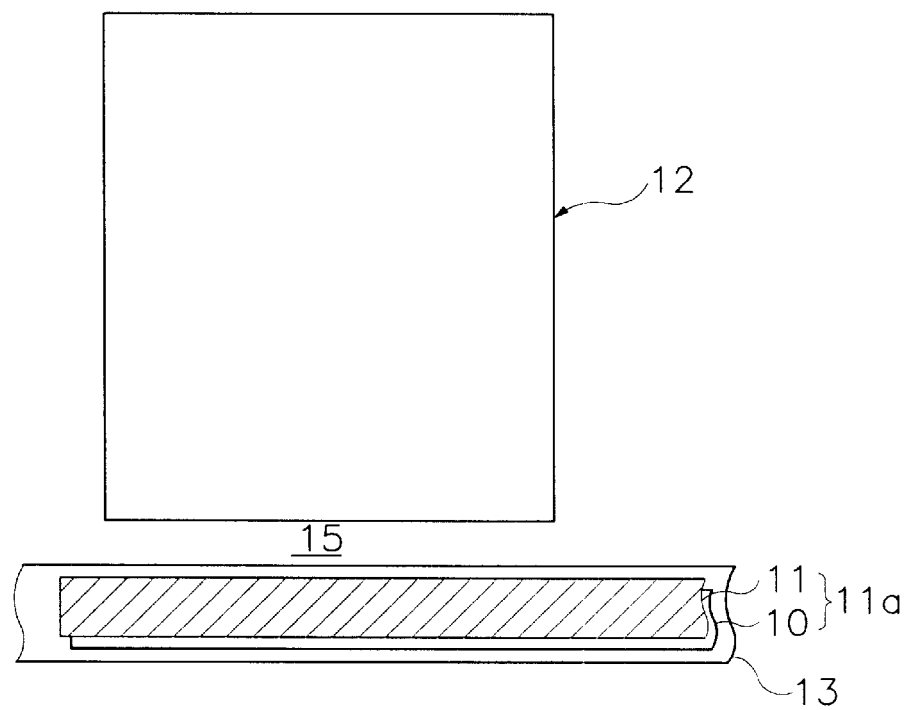
Figure 3B:
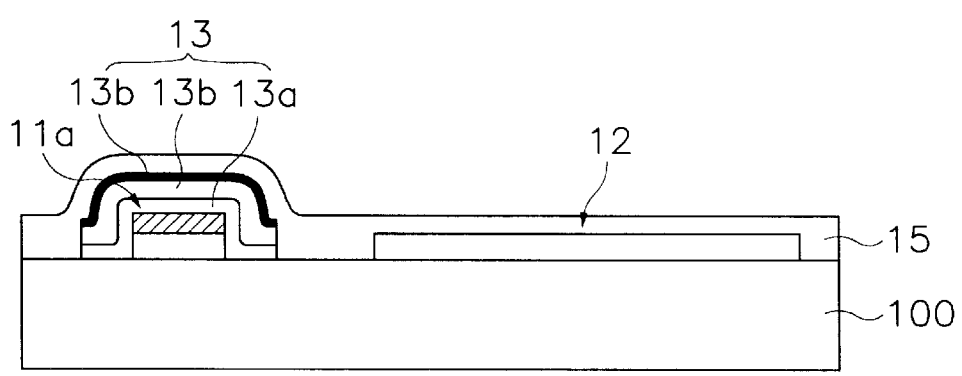

As shown in FIGS. 2B and 3B, a gate insulating layer 13a, an amorphous silicon layer 13b and a doped amorphous silicon layer 13c are sequentially formed at the upper portion of the rear substrate 100 where the gate bus line 11a and the counter electrode region 11 have been formed. The gate insulating layer 13a, the amorphous silicon layer 13b and the doped amorphous silicon layer 13c are patterned in an identical shape according to a second mask process, thereby forming an active region 13 overlapped with the whole region of the gate bus line 11a. Here, a channel and an ohmic contact portion of a thin film transistor are formed, and the counter electrode region 11b is opened.

On the other hand, in the second mask process, the opaque metal layer 11 for the gate bus line in the gate pad region is removed. Even if the gate pad consists of the ITO layer 10 for the counter electrode, a signal transmission function is not so damaged.

Thereafter, the opaque metal layer 11 for the gate bus line in the opened counter electrode region is removed, thereby forming the counter electrode 12. The counter electrode 12 has a single layer structure of the ITO layer 10 for the counter electrode.

Figure 2C:
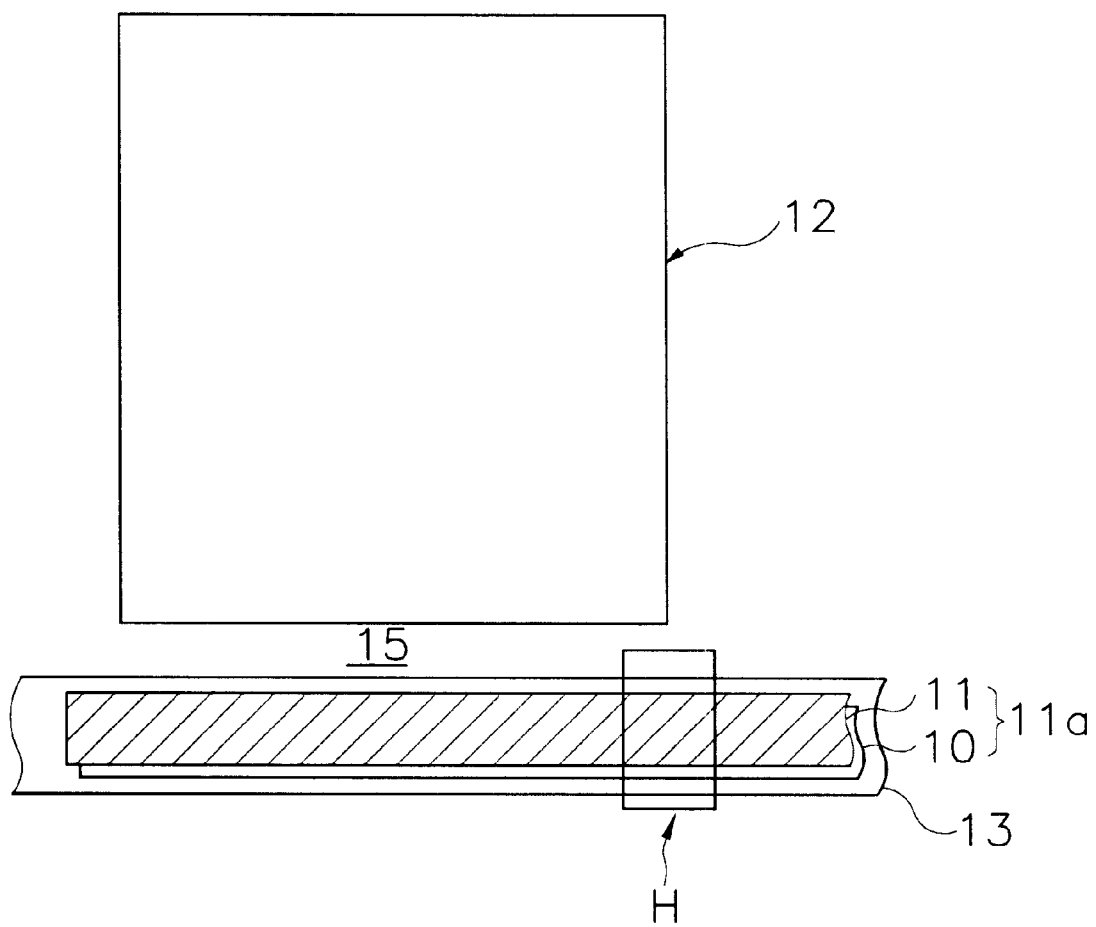
Figure 3C:
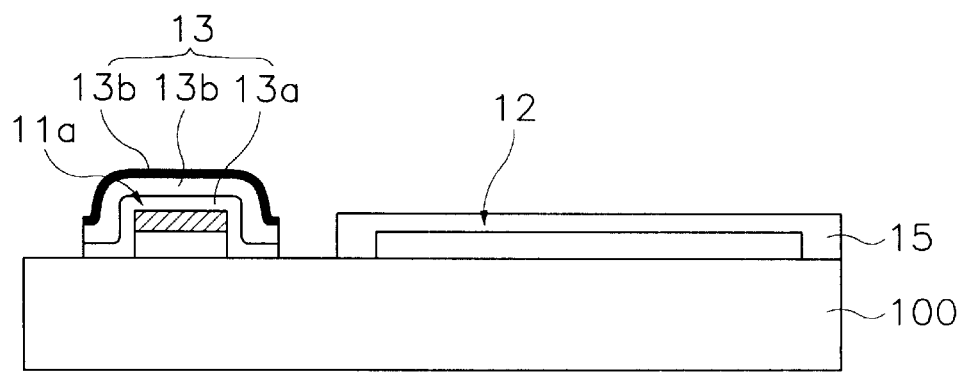

An electrode insulating layer 15 is deposited on the rear substrate 100 where the counter electrode 12 has been formed. Preferably, the electrode insulating layer 15 consists of an insulating layer having a dielectric constant from 2 to 4 such as a polyimide layer, in order to prevent excessive increase of an auxiliary capacitance between the counter electrode 12 and a pixel electrode which will be formed in a succeeding process. As illustrated in FIGS. 2C and 3C, the electrode insulating layer 15 is patterned according to a third mask process, thereby opening a part(H) of the active region 3 and the gate pad. Here, the active region 3 is partially opened to form the thin film transistor. When the electrode insulating layer 15 is a polyimide layer, it can be patterned in accordance with exposure, developing and hardening processes.

Figure 2D:
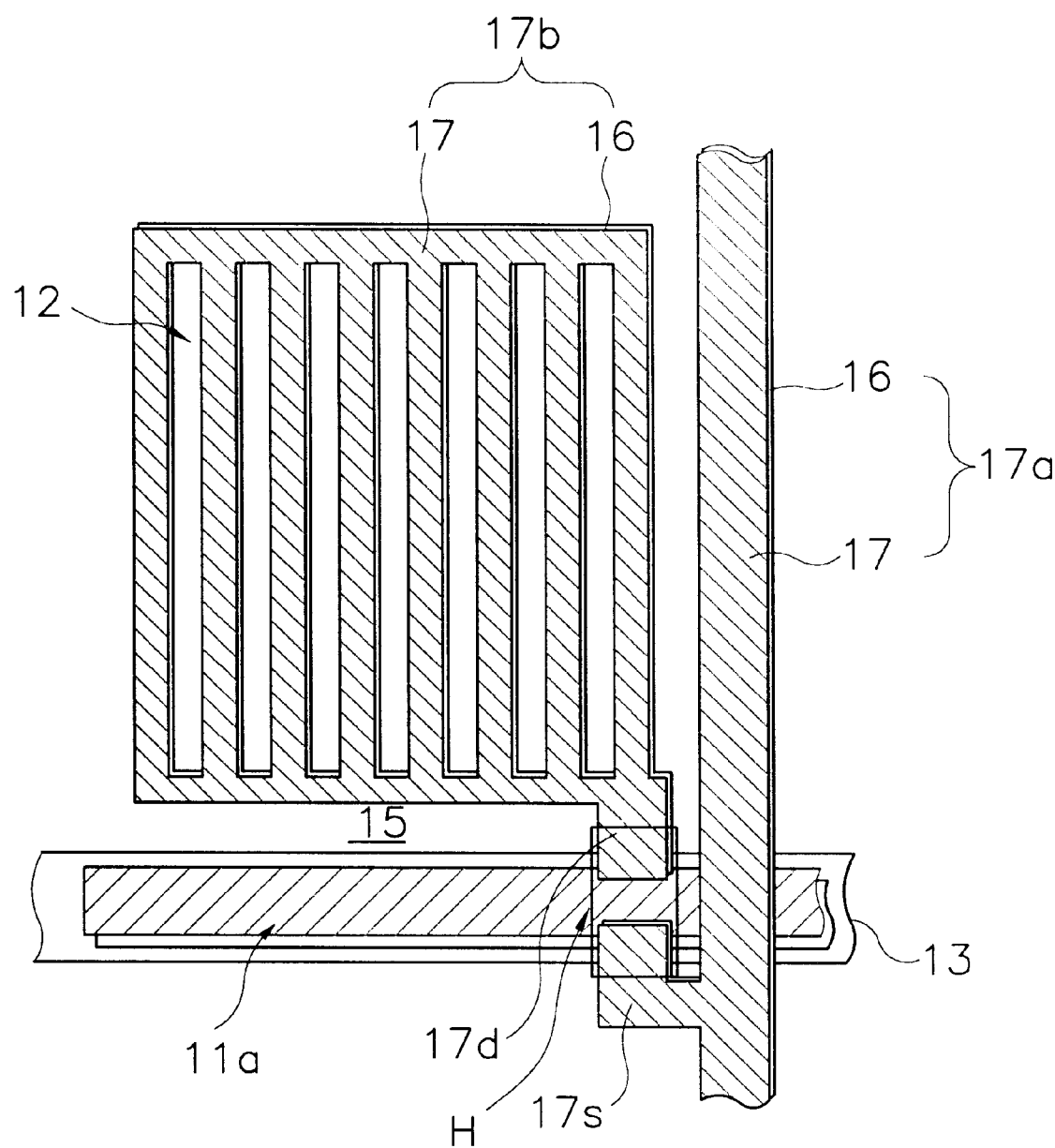
Figure 3D:
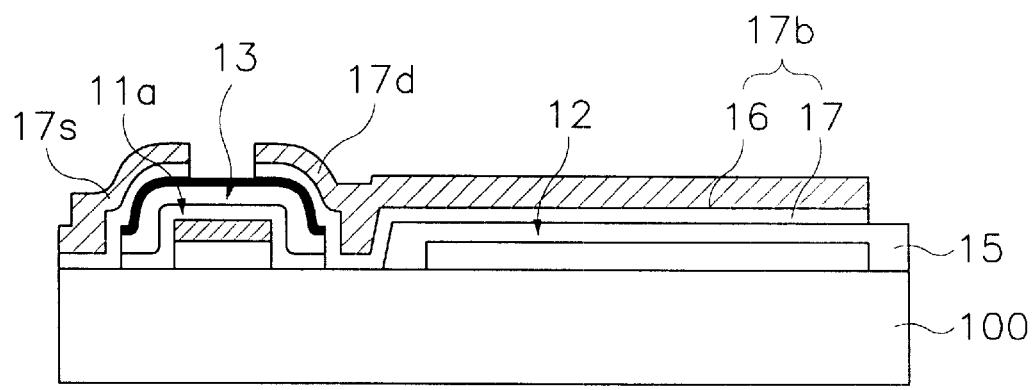

As depicted in FIGS. 2D and 3D, an ITO layer 16 for a pixel electrode and an opaque metal layer 17 for a data bus line such as Mo, Al and Mo/Al/Mo are deposited at the upper portion of the rear substrate 100 where the part(H) of the active region 3 and the gate pad have been opened. Here, the gate pad is electrically connected to the opaque metal layer 17 for the data bus line. Thereafter, the ITO layer 16 for the pixel electrode and the opaque metal layer 17 for the data bus line are patterned according to a fourth mask process, thereby forming a data bus line 17a crossing the gate bus line 11a, a source electrode 17s and a drain electrode 17d extended from the data bus line 17a and electrically connected to the active region, the channel of the thin film transistor being positioned therebetween, and a pixel electrode region 17b overlapped with the counter electrode 12. The data bus line 17a, source electrode 17s and the drain electrode 17b have a double layer structure of the ITO layer 16 for the pixel electrode and the opaque metal layer 17 for the data bus line. Here, a contact portion of the gate pad is formed at the same time.

Figure 2E:
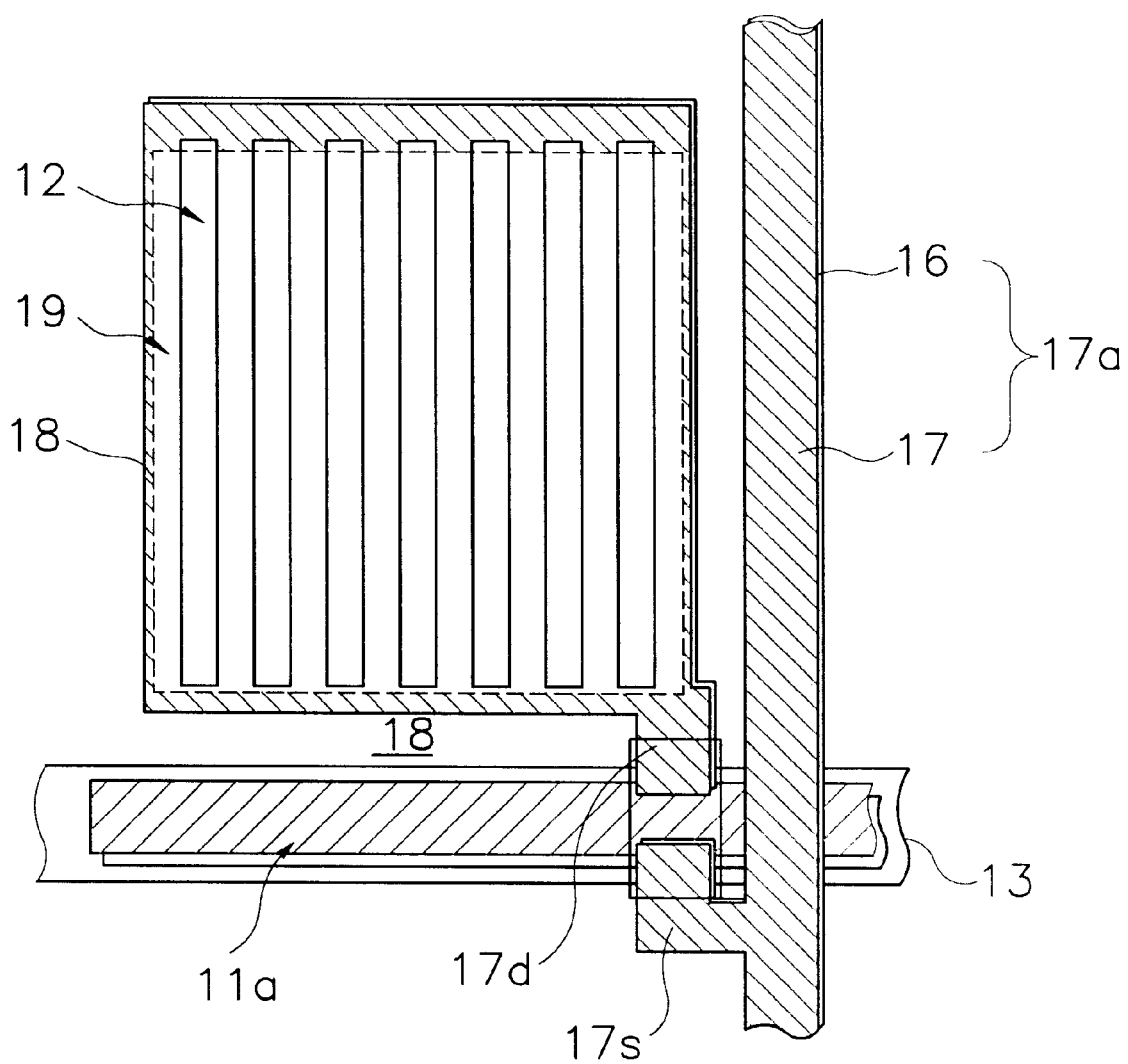
Figure 3E:
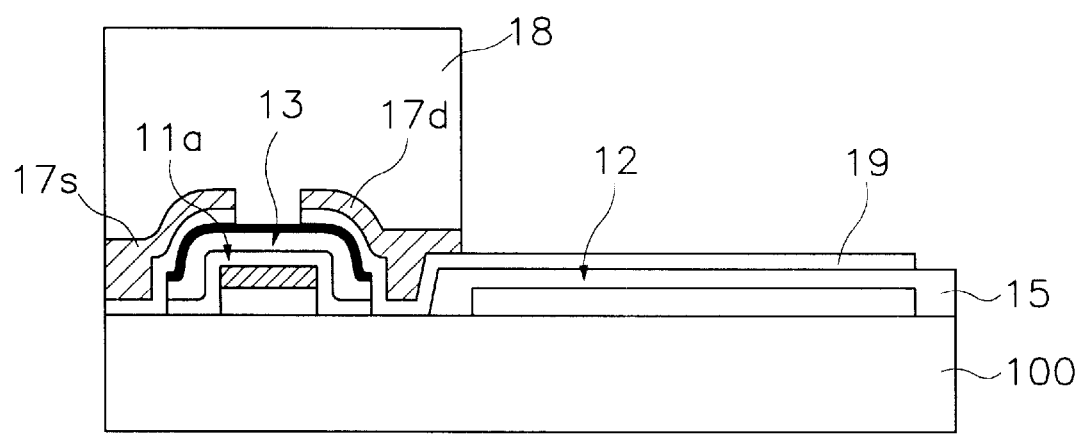

As illustrated in FIGS. 2E and 3E, a protective layer 18 is deposited at the upper portion of the rear substrate 100 where the data bus line 17a, source electrode 17s, drain electrode 17d and pixel electrode region 17b have been formed. The deposited protective film 18 is patterned according to a fifth mask process, thereby opening the pixel electrode region 17b and the contact portion of the gate pad.

Finally, the pixel electrode 19 is formed by removing the opaque metal layer 17 for the data bus line in the opened pixel electrode region 18. The pixel electrode 19 has a single layer structure of the ITO layer 16 for the pixel electrode.

As discussed earlier, in the method for manufacturing the fringe field switching mode liquid crystal display device in accordance with the present invention, the gate bus line has a double layer structure of the ITO layer and the opaque metal layer, and thus the gate bus line and the counter electrode region where the counter electrode is formed are formed at the same time. In addition, the data bus line has a double layer structure of the ITO layer and the opaque metal layer, and thus the data bus line and the pixel electrode region where the pixel electrode is formed are formed at the same time.

As a result, a manufacturing time and cost are reduced and a yield is increased due to a decreased number of the mask processes.

On the other hand, it should be recognized that the present invention can also be implemented in different embodiments. For example, an oxide or nitride layer may be employed as the electrode insulating layer.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a method for manufacturing a fringe field switching mode liquid crystal display device including a pixel electrode and a counter electrode formed on a rear substrate to generate a fringe field in a liquid crystal cell; a thin film transistor consisting of a gate electrode, a source electrode, a drain electrode and a channel, and applying a picture signal between the pixel electrode and the counter electrode; and a gate pad formed at the edge of the rear substrate, a method for manufacturing a fringe field switching mode liquid crystal display device, comprising the steps of:

sequentially stacking a transparent conductive layer for a counter electrode and an opaque metal layer for a gate bus line on the surface of the rear substrate;

forming a gate bus line connected to the gate electrode, a counter electrode region for forming the counter electrode, and a gate pad region for forming the gate pad, by patterning the transparent conductive layer for the counter electrode and the opaque metal layer for the gate bus line in an identical shape;

sequentially stacking a gate insulating layer, an amorphous silicon layer and a doped amorphous silicon layer on the rear substrate where the gate bus line and the counter electrode region have been formed;

forming an active region overlapped with the whole region of the gate bus line, by patterning the gate insulating layer, the amorphous silicon layer and the doped amorphous silicon layer in an identical shape;

forming the counter electrode and the gate pad, by removing the opaque metal layer for the gate bus line in the counter electrode region and gate pad region;

depositing an electrode insulating layer on the rear substrate where the active region, counter electrode and gate pad have been formed;

opening a part of the active region and the gate pad, by patterning the electrode insulating layer;

depositing a transparent conductive layer for a pixel electrode and an opaque metal layer for a data bus line on the rear substrate where the active region and gate pad region have been opened;

forming a data bus line crossing the gate bus line, a source electrode and a drain electrode respectively electrically connected to the active region, the channel of the thin film transistor being positioned therebetween, a pixel electrode region for forming the pixel electrode to be overlapped with the counter electrode, and a contact portion of the gate pad, by patterning the transparent conductive layer for the pixel electrode and the opaque metal layer for the data bus line in an identical shape;

depositing a protective layer on the rear substrate where the data bus line, source electrode, drain electrode, pixel electrode region and gate pad have been formed;

opening the pixel electrode region and the contact portion of the gate pad, by pattering the deposited protective film; and forming the pixel electrode by removing the opaque metal layer for the data bus line in the opened pixel electrode region.

2. The method according to claim 1, wherein the transparent conductive layer for the counter electrode and the transparent conductive layer for the pixel electrode are indium tin oxide(ITO) layers.

3. The method according to claim 1, wherein the opaque metal layer for the gate bus line consists of one of Mo, Cr, Al and MoW.

4. The method according to claim 1, wherein the opaque metal layer for the data bus line consists of one of Mo, Al and Mo/AL/Mo.

5. The method according to claim 1, wherein a dielectric constant of the electrode insulating layer ranges from 2 to 4.

6. The method according to claim 5, wherein the electrode insulating layer is a polyimide layer.

7. The method according to claim 6, wherein the step for pattering the electrode insulating layer comprises the steps of:

exposing the electrode insulating layer; and developing the exposed electrode insulating layer.

8. The method according to claim 7, further comprising a step for hardening the developed electrode insulating layer between the step for developing the exposed electrode insulating layer and the step for patterning the transparent conductive layer for the pixel electrode and the opaque metal layer for the data bus line.

* * * * *